Feb. 24, 1953  F. L. CORBIN  2,629,259
SQUARE LAW FORCE MEASURING DEVICE
Filed Oct. 11, 1946  2 SHEETS—SHEET 1

INVENTOR
Francis L. Corbin
BY
ATTORNEY

Feb. 24, 1953 F. L. CORBIN 2,629,259
SQUARE LAW FORCE MEASURING DEVICE
Filed Oct. 11, 1946 2 SHEETS—SHEET 2

INVENTOR
Francis L. Corbin
BY
his ATTORNEY

Patented Feb. 24, 1953

2,629,259

UNITED STATES PATENT OFFICE 2,629,259

SQUARE LAW FORCE MEASURING DEVICE

Francis L. Corbin, Chatham, N. J., assignor to Pitometer Log Corporation, New York, N. Y., a corporation of New York Application October 11, 1946, Serial No. 702,819

5 Claims. (Cl. 73—182)

My invention relates to a square law device, that is, a mechanism which gives a reading proportionate to the square root of a force applied thereto. While such a device may have numerous applications, one of the chief uses thereof is in connection with either a flow meter or a ship's log, both of which devices measure the relative speed of a liquid, a flow meter measuring the velocity of liquid flowing through a pipe, while a ship's log measures the speed of the ship through the water. Inasmuch as the pressure produced by movement of liquid relative to a Pitot orifice is proportionate to the square of the speed, it is necessary to extract the square root of this pressure in order to obtain a reading directly proportionate to the speed.

In the following my invention will be described in connection with a ship's log although, as above indicated, it is to be understood that it is not limited to this particular use.

Further objects and advantages of my invention will be apparent from the following description considered in connection with the accompanying drawings which form a part of this specification and of which:

Figure 1:
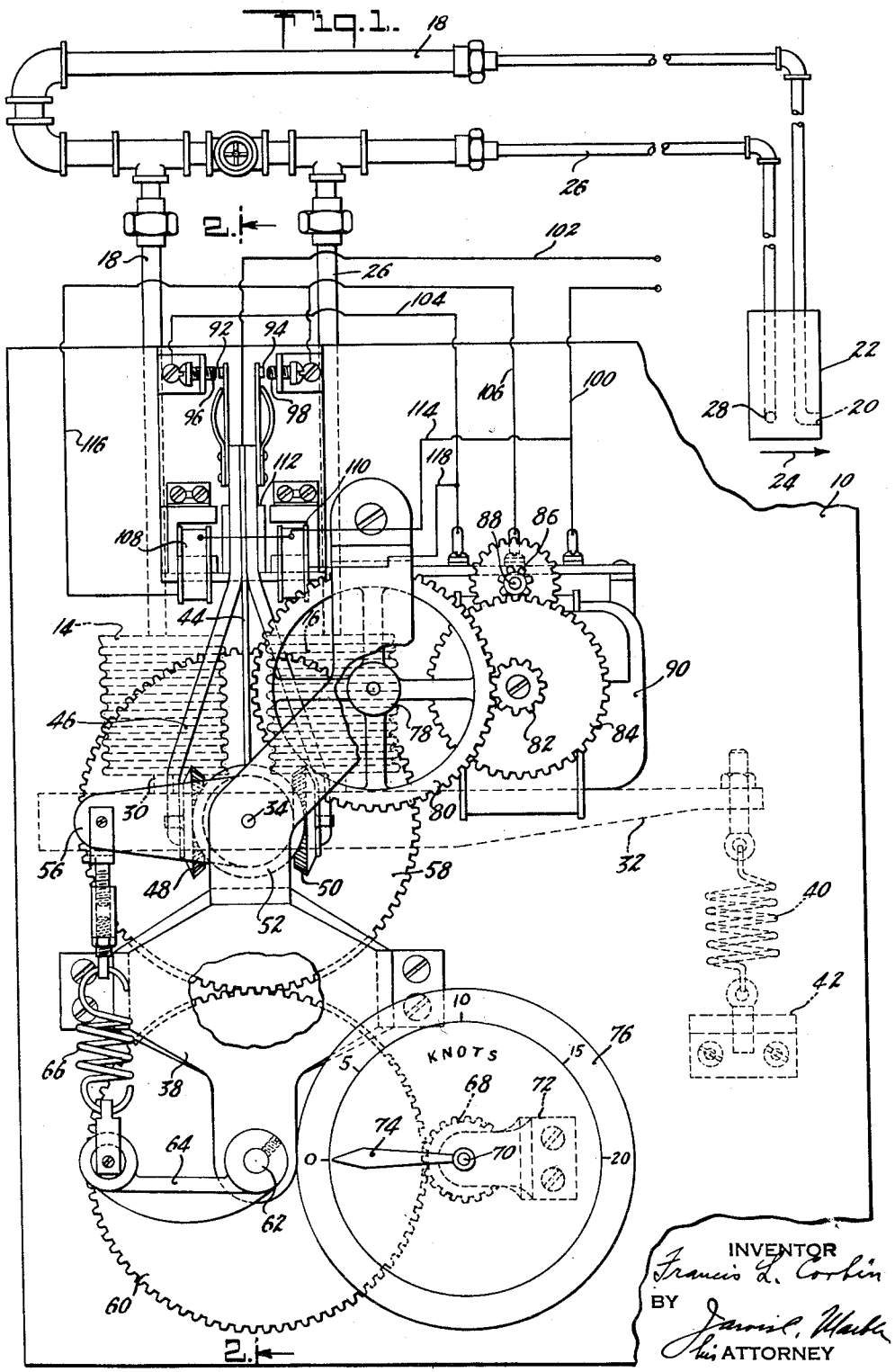
Fig. 1 is a front view of an apparatus in accordance with my invention.
Figure 2:
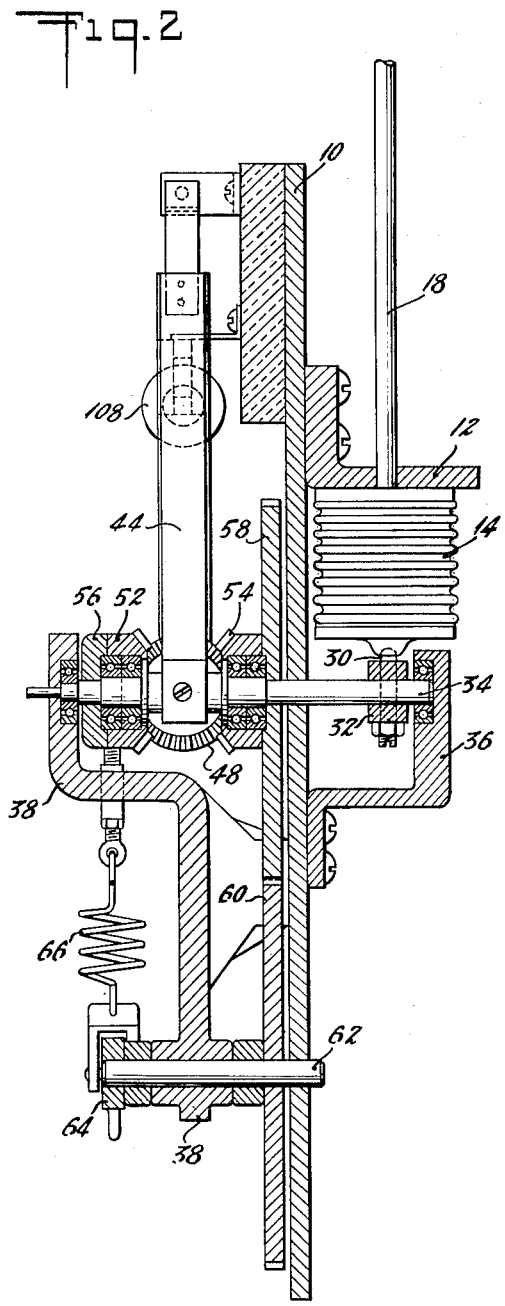
Fig. 2 is a cross-sectional view taken on the line 2—2 of Fig. 1.

Referring to the drawings, reference character 10 designates a base plate upon which the square law mechanism is mounted. A bracket 12 is secured to the rear of the plate and supports a pair of axially expandable and contractible Sylphon bellows 14 and 16. The interior of the bellows 14 is connected by means of a conduit system 18 with the dynamic orifice 20 of a rod 22 which is disposed outside the hull of the ship and well below the water line, the orifice 20 facing forward so that, when the ship is moved forwardly it moves relative to the water in the direction indicated by the arrow 24. The bellows 16 is connected by means of the pipe system 26 with the static orifice 28 formed in the rod, this orifice opening in a plane which is parallel to the direction of movement of the ship.

The lower movable heads of the bellows 14 and 16 bear against pins 30 carried by a balance arm 32, the two pins 30 being disposed on opposite sides of a rotatable shaft 34 to which the balance arm is secured. This shaft is rotatably mounted in suitable bearings carried by brackets 36 and 38 mounted on opposite sides of the base plate 10, shaft 34 extending through the base plate. A tension spring 40 is secured between a bracket 42 carried by the mounting plate and the end of arm 32 which is on the same side of shaft 34 as is the bellows 16.

Fixed to the shaft 34 on the forward side of the plate 10 is an arm 44. A pair of divergent arms 46 is connected to the upper end of arm 44, the lower spaced ends of these arms rotatably carrying bevelled gears 48 and 50. These gears mesh with a pair of bevelled gears 52 and 54 which are rotatably mounted on the shaft 34. The gear 52 is rigidly fixed to an arm 56, while the gear 54 is rigidly secured to a spur gear 58. The spur gear meshes with a spur gear 60 of the same diameter which is fixed to a shaft 62 rotatably mounted in the plate 10 and in the bracket 38. An arm 64 is rigidly secured to the shaft 62 so as to turn with the gear 60. A tension spring 66 is secured between the arms 56 and 64, the effective lengths of these arms being equal.

Gear 60 also meshes with a pinion gear 68 which is fixed to a shaft 70 rotatably mounted in the base plate and in a bracket 72. The forward end of shaft 70 carries a pointer 74 which is arranged to move over a stationary scale 76 which is calibrated in units of speed, such as knots.

Gear 58 meshes with a pinion 78 which is connected through the gear train including gears 80, 82, 84 and 86 with the driving shaft 88 of a reversible electric motor 90.

The upper end of the assembly comprising the arms 44 and 46 carries a pair of movable contacts 92 and 94 which are disposed between fixed contacts 96 and 98. One terminal of a suitable source of electric current is connected by means of a conductor 100 with a terminal of the motor 90, while a conductor 102 connects the other side of the source of power with the movable contact points 92 and 94. The fixed contacts 96 and 98 are connected by means of conductors 104 and 106, respectively, with the two other terminals of the motor 90. The construction of this motor is such that when current is supplied to it through conductors 100 and 104 it rotates in one direction, while when current is supplied through contacts 100 and 106 it rotates in the opposite direction.

A pair of electro-magnets 108 and 110 are disposed on opposite sides of the arms 44 and 46, the latter carrying a block of magnetic material 112. One terminal of each of the electro-magnets is connected by a conductor 114 to the conductor 100, while the other terminal of the magnet 108 is connected by the conductor 116 to the conductor 106 leading from the fixed contact 98, while the other terminal of the magnet 110 is connected by the conductor 118 to the conductor 104 leading from the fixed contact 96.

The above described device operates as follows.

In the drawings the parts are shown in the positions which they occupy at zero speed of the ship. Under these conditions the fluid pressure acting through the dynamic orifice 20 will be equal to that acting through the static orifice 28, and will be dependent upon the draft of the ship. If the draft remained constant it would not be necessary to provide a static orifice, but inasmuch as the draft varies in accordance with the loading of the ship, the static orifice and bellows 16 serve to balance the fluid pressure resulting from the liquid head so that the difference in pressures acting on the two bellows is equal to the dynamic pressure resulting from movement of the dynamic orifice through the water.

As above stated, when the ship is stationary, there is no dynamic pressure and hence the pressures exerted by the two bellows are equal. As the force resulting from these pressures are applied to the balance arm 32 at points equi-distant from the shaft 34, they produce no turning moment on the balance arm. However, the spring 40 produces a constant turning moment tending to rotate the arm and hence the shaft 34 in a clockwise direction as viewed in Fig. 1. This tends to rotate the assembly consisting of the arms 44 and 46 and the differential bevelled gears 48 and 50 in a clockwise direction. Inasmuch as these gears mesh with the bevelled gears 52 and 54, such motion could take place only if one or both of these gears were rotated in a clockwise direction as viewed in Fig. 1. If the gear 52 were rotated in a clockwise direction the arm 46 would be turned in the same direction, but if the gear 54 and hence also the gear 58 were turned clockwise, it would result in rotating the gear 60 and hence the arm 64 counterclockwise. Such motions in opposite directions of the two arms would increase the tension of the spring 66. As a matter of fact, it is the turning moments produced by the tension of this spring acting through the arms 56 and 64 and transmitted through the gearing to the balance arm 32, which balance the turning moment produced by the spring 40 acting directly on the balance arm 32. It will be noted that the turning moment produced by the spring 66 depends upon the angular positions of the arms 56 and 64. If both these arms extended exactly vertically downwardly the spring would produce no turning moment whatsoever on either gear 52 or the gear 60, because the line of force would coincide with the line connecting the centers of these two gears. The maximum turning moment is obtained when the arms 56 and 64 are normal to this line, as shown in the drawing, and the turning moment produced by the spring 66 for other positions of the arms varies substantially inversely with the square of the angle between the arms and the horizontal for arm position varying from those shown in the drawing to a position of approximately 30° from the horizontal counterclockwise. In other words, if the angle with the horizontal is doubled, the turning moment is decreased four times. It will also be noted that the tension of the spring 66, as distinguished from the turning moments produced thereby, remains constant for all positions of the arms. This is due to the fact that inasmuch as these arms are of equal length and are turned in the same direction through equal angles, the distance between their ends remains constant.

As above stated, the turning moment applied to the arm 32 by the spring 66 when the arms 56 and 64 are in the position shown, namely at an angle of 90° with the intersection of their center lines, is equal and opposite to the turning moment applied to arm 32 by the spring 40. If the ship now gets under way, dynamic pressure is produced in the orifice 20 and is communicated through the pipes 18 to the bellows 14. The additional force now exerted by the bellows 14 on the balance arm 32 in the same direction as the force applied to the arm by the spring 66 unbalances the system and causes this arm and the shaft 34 to pivot slightly in a counterclockwise direction, thus turning the arms 44 and 46 slightly counterclockwise and closing the circuit to the motor 90 through the contacts 92 and 96. This causes the motor to operate in the proper direction to rotate the spur gear 58 in a clockwise direction, which drives the spur gear 60 and the arm 64 in a counterclockwise direction. Inasmuch as bevelled gear 54 is fixed to spur gear 58 it also rotates clockwise and drives the bevelled gear 52 counterclockwise through the bevelled gears 48 and 50. This in turn causes the arm 56 to turn counterclockwise. Inasmuch as the ratio between the gears 58 and 60 is the same as the ratio between the gears 54 and 52, namely unity, the two arms 56 and 64 move through the same angle. As above stated, this does not change the tension of the spring 66, but it does decrease the turning moment exerted by the spring in an amount proportionate to the square of the angle through which the two arms are turned.

Inasmuch as the dynamic pressure produced at the orifice 20 is proportionate to the square of the speed, and the rotation of the arms 56 and 64 is proportionate to the square of the turning moment produced by the spring 66, the rotation of the gear 60 is directly proportionate to the change in speed of the ship. Consequently, the rotation of the pointer 74 caused by the rotation of the gear 60 indicates the speed at which the ship is travelling.

Actually, motor 90 does not run continuously until the balance in the system is restored inasmuch as, as is well known, this would result in over-regulation and hunting. The closing of the circuit through the contacts 92 and 96 energizes the electro-magnet 110 which thereupon attracts the armature 112 carried by the lever 44 so as to again open the circuit. In the meantime, the motor 90 is operated in the proper direction to restore the balance. As soon as the circuit is open the electro-magnet 110 is de-energized and if the operation of the motor has not been sufficient to completely restore the balance, the circuit will again be completed through the contacts 92 and 96 and the cycle will be repeated. Thus, the system is brought back into balance by means of a series of steps.

In the event that the speed of the ship is reduced the force exerted by the bellows 14 is reduced, and hence the spring 40 turns the lever 32 a slight amount in a clockwise direction. This serves to complete the circuit through the contacts 94 and 98, thus causing the motor to operate in the opposite direction so as to turn the arms 56 and 64 clockwise. This in turn increases the turning moment exerted by the stationary tension spring 66 until it balances the new turning moment applied to arm 32.

If the electro-magnets 108 and 110 were not provided the motor 90 would continue to operate until the turning moment produced by the spring 66 had been decreased sufficiently to balance the resultant turning moment applied to the arm 32 by the bellows and the spring 40, whereupon the arm 44 would be returned to its neutral position, thus opening the contacts and stopping the motor.

It will be noted that the change in elongation of the springs 40 and 66 is very slight and need be sufficient only to open and close the electric contacts. Consequently, it is not necessary to employ accurately calibrated springs and no error is introduced into the system due to improperly calibrated springs. In practice this has been found to more than compensate for the slight error resulting from the fact that the change in turning moment produced by the spring 66 is not exactly inversely proportionate to the square of the angle between the arms 56 and 64 and the horizontal.

While I have shown and described one more or less specific embodiment of my invention as applied to a ship's log, it is to be understood that this has been done for purposes of illustration only, and that the scope of my invention is not to be limited thereby, but is to be determined from the appended claims.

What is claimed:

1. In a device of the class described, a rotatable shaft, a balance lever secured to said shaft, means for applying a turning moment to said lever proportionate to the square of a variable value, means for applying a substantially constant turning moment to said lever, a beveled gear carried by said shaft with its axis of rotation normal to the axis of the shaft, a pair of coaxially mounted beveled gears meshing with the first-mentioned gear, a pair of arms turnably mounted on parallel axes, motion transmitting means between said pair of gears and said arms for causing one of said arms to turn in the opposite direction from one gear of said pair and the other arm to turn in the same direction as the other gear of said pair, and for maintaining said arms substantially parallel to each other, spring means stressed between said arms, means for turning said arms to thereby vary the turning moment resulting from said spring means and transmitted through said motion transmitting means, the gears, and said shaft to said lever and means movable in direct proportion to the angle of movement of said arms.

2. In a device of the class described, a rotatable shaft, a balance lever secured to said shaft, means for applying a turning moment to said lever proportionate to the square of a variable value, means for applying a substantially constant turning moment to said lever, a beveled gear carried by said shaft with its axis of rotation normal to the axis of the shaft, a pair of coaxially mounted beveled gears meshing with the first-mentioned gear, a pair of arms turnably mounted on parallel axes, motion transmitting means between said pair of gears and said arms for causing one of said arms to turn in the opposite direction from one gear of said pair and the other arm to turn in the same direction as the other gear of said pair, and for maintaining said arms substantially parallel to each other, spring means stressed between said arms, a pair of fixed electrical contacts, an electrical contact movable with said lever between said pair of contacts, a reversible motor controlled by said contacts, driving means between said motor and said arms for turning the latter to thereby vary the turning moment resulting from said spring means and transmitted through said motion transmitting means, the beveled gears and said shaft to said lever, and means for indicating the angle through which said arms are turned.

3. In a device of the class described, a rotatable shaft, a balance lever secured to said shaft, means for applying a turning moment to said lever proportionate to the square of a variable value, a spring for applying a substantially constant turning moment to said lever in opposition to the first-mentioned turning moment, a first pair of bevel gears rotatably mounted to turn on an axis normal to and intersecting the axis of said shaft, a second pair of bevel gears rotatably mounted on said shaft and meshing with said first pair of gears, a first arm connected to turn with one gear of said second pair, a second arm turnably mounted about an axis parallel to the axis of said first arm, reverse gearing between the other gear of said second pair and said second arm for causing the latter to turn in the opposite direction from said other gear and to maintain said arms substantially parallel to each other, spring means stressed between said arms, means for turning said arms to thereby vary the turning moment resulting from said spring means and transmitted through said reverse gearing, said bevel gears and said shaft to said lever and means movable in direct proportion to the angle of movement of said arms.

4. In a ship's log, a differential Pitot member having a dynamic orifice and a static orifice, a rotatable shaft, a balance lever secured to said shaft, a pair of Sylphon bellows applied to said lever at points equidistantly spaced from said shaft, means for transmitting fluid pressure from said orifices to the respective bellows, a spring for applying a substantially constant turning moment to said lever in opposition to the turning moment applied thereto by the bellows connected to said dynamic orifice, structure secured to said shaft, a first pair of bevel gears rotatably mounted on said structure on an axis normal to and intersecting the axis of said shaft, a second pair of bevel gears rotatably mounted on said shaft and meshing with said first pair of gears, a first arm connected to turn with one gear of said second pair, a second arm turnably mounted about an axis parallel to the axis of said first arm, reverse gearing between the other gear of said second pair and said second arm for causing the latter to turn in the opposite direction from said other gear and to maintain said arms substantially parallel to each other, spring means stressed between said arms, means for turning said arms to thereby vary the turning moment resulting from said spring means and transmitted through said reverse gearing, said bevel gears and said shaft to said lever and means movable in direct proportion to the angle of movement of said arms.

5. In a ship's log, a differential Pitot member having a dynamic orifice and a static orifice, a rotatable shaft, a balance lever secured to said shaft, a pair of Sylphon bellows applied to said lever at points equidistantly spaced from said shaft, means for transmitting fluid pressure from said orifices to the respective bellows, a spring for applying a substantially constant turning moment to said lever in opposition to the turning moment applied thereto by the bellows connected to said dynamic orifice, structure secured to said shaft, a first pair of bevel gears rotatably mounted on said structure on an axis normal to and intersecting the axis of said shaft, a second pair of bevel gears rotatably mounted on said shaft and meshing with said first pair of gears, a first arm connected to turn with one gear of said second pair, a second arm turnably mounted about an axis parallel to the axis of said first arm, reverse gearing between the other gear of said second pair and said second arm for causing the latter to turn in the opposite direction from said other gear and to maintain said arms substantially parallel to each other, spring means stressed between said arms, a pair of fixed electric contacts, an electrical contact movable with said lever between said pair of contacts, a reversible motor controlled by said contacts, driving means between said motor and said arms for turning the latter to thereby vary the turning moment resulting from said spring means and transmitted through said reverse gearing, said bevel gears and said shaft to said lever, indicating means uniformly calibrated in units of speed and operable in response to the turning of said arms.

FRANCIS L. CORBIN.

REFERENCES CITED

The following references are of record in the file of this patent:

UNITED STATES PATENTS

| Number | Name | Date |
| --- | --- | --- |
| 1,968,539 | Rydberg | July 31, 1934 |
| 1,972,713 | Melas | Sept. 4, 1934 |
| 2,003,839 | Smith | June 4, 1935 |
| 2,344,512 | Lanham | Mar. 31, 1944 |
| 2,441,468 | Brownscombe | May 11, 1948 |